Jan. 14, 1969 P. J. KIRCHER 3,422,236
APPLIANCE HAVING A ROTATABLE TWO-PART ACTUATOR
CAPTIVATED BY A FRAME MEMBER
Filed Feb. 16, 1967

WITNESSES
Edwin E. Barber
James F. Young

INVENTOR
Paul J. Kircher
BY B.B.Sklar, Jr.

United States Patent Office 3,422,236
Patented Jan. 14, 1969

3,422,236
APPLIANCE HAVING A ROTATABLE TWO-PART ACTUATOR CAPTIVATED BY A FRAME MEMBER
Paul J. Kircher, Mansfield, Ohio, assignor to Westinghouse Electric Corporation, Pittsburgh, Pa., a corporation of Pennsylvania
Filed Feb. 16, 1967, Ser. No. 616,573
U.S. Cl. 200—157   7 Claims
Int. Cl. H01h 9/06; H01h 13/08; H01h 21/10

ABSTRACT OF THE DISCLOSURE

A switch assembly for a power operated appliance. A frame member which supports mechanical drive mechanism within the casing of the appliance housing is provided with a keyhole-shaped aperture for receiving the shank portion of a switch actuator which shank portion is insertable through an aperture in the casing and through the larger area of the keyhole-shaped aperture when aligned with the aperture in the casing. Further insertion of the frame member into the casing moves the shank portion, which is provided with an annular groove, into the smaller area of the keyhole-shaped aperture wherein the actuator is captivated.

---

This invention relates, in general, to domestic appliances and, more particularly, to power operated toothbrushes.

Domestic appliances of the type herein contemplated utilize a small capacity DC motor which may be energized by means of a rechargeable battery connected thereto through a switch and suitable electrical leads. The switch is supported within a casing of the size, shape and weight making it convenient to be held in the hand of the user.

A switch actuating member employed for closing the contacts of the switch is of necessity mounted on the exterior of the casing either before insertion of the switch, motor, battery and other mechanism supported within the casing or afterwards. In any event, installation of the actuating member is usually a cumbersome and expensive task.

Moreover, the types of actuators available present problems from the standpoint of providing suitable sealing between the casing and the actuator to prevent water leakage into the casing. This problem has been solved to satisfactory degree but only at additional expense to the manufacturer which expense is usually absorbed by the ultimate consumer. Besides the additional expense, some types of seals used render it impossible to provide positive engagement between the actuator and the switch thereby resulting in the age old problem of improper alignment between actuator and switch contacts.

Accordingly, it is the general object of this invention to provide a new and improved power handle for use in brushing teeth.

It is a more particular object of this invention to provide, in an appliance power handle, a new and improved switch assembly.

Another object of this invention is to provide a new and improved switch assembly which is simple in construction and inexpensive to manufacture.

Briefly, the above-cited objects are accomplished by providing an appliance power handle comprising a hollow casing adapted to receive mechanism for generating at least two modes of operation when a DC motor, also received in the casing, is energized. Power for running the motor is provided by a suitable source, for example, a rechargeable battery connected to the motor through a double-pole, double-throw, rotary switch.

The rotary switch is so constructed that it is capable of reversing the polarity through the motor in order to selectively drive a pinion affixed to the output shaft thereof, either clockwise or counterclockwise in order to effect one or the other of the possible modes of operation of the motion generating mechanism. To this end it comprises a generally circular electrically nonconducting member carrying spaced apart conductors connected to suitable electrical leads, the other ends of which are connected to the motor. The nonconducting member is disposed in a recess of a frame member constituting a part of the mechanism mentioned above. Mounted on the frame member are a pair of spring-like electrically conducting fingers having terminal portions connected to leads connected to the battery. The opposite ends of the spring-like fingers are provided with detents which in the inoperative position of the switch are seated in a notch in the nonconducting member intermediate the conductors carried thereby. The spring-like fingers serve to captivate the nonconducting member in the recess rendering it unnecessary for the attachment thereof to the frame member.

The nonconducting member has on its reverse side a tongue like projection which is received in a groove provided in a switch actuator for effecting engagement and disengagement of the detents with the conductors by rotating the nonconductor by means of the actuator. The actuator or that portion thereof which engages the tongue is insertable through a generally circular aperture in the casing and then through a larger area of substantially key-shaped aperture in the frame member on which the nonconducting member is captivated. At this point in the assembly the power handle has not been completely inserted into the casing. Upon further insertion of the frame member the shank portion of the actuator moves into the smaller area of the key-shaped aperture to thereby secure the actuator in place.

Other objects and advantages of the present invention will become more apparent when considered in view of the following description and accompanying drawings in which.

Figure 1:
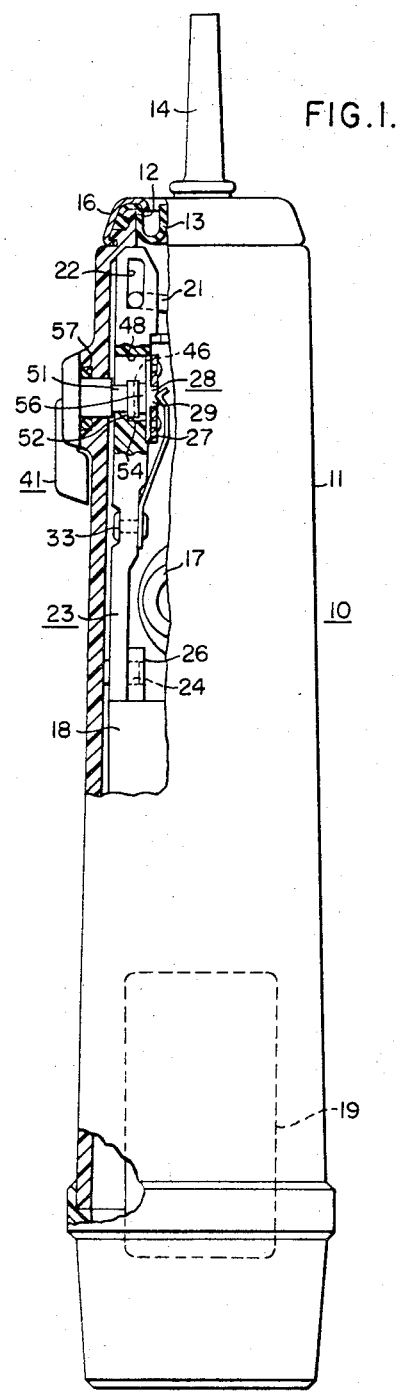
FIGURE 1 is an elevational view, partly broken away, of a power handle representing the invention.

Referring now to the drawings, especially FIG. 1, reference character 10 designates generally a power handle or unit for a toothbrush. The power unit 10 comprises a hollow casing 11 which is tapered from the bottom to the top thereof. The casing has an opening 12 whereat a flexible apron or sealing member 13 serves to prevent water leakage into the casing 11 and through which a toothbrush support or post 14 extends. The apron is held in place by a retaining ring 16 which snaps over that end of the casing.

The post member 14 is supported from within the casing 11 by motion generating mechanism only partially shown at 17. The motor generating mechanism 17 is rendered operable through a suitable electric motor 18 in a manner shown and described in patent application No. 616,646, filed in the name of Paul J. Kircher and assigned to the same assignee as this application. Power is supplied to the motor 18 by a battery 19 in a manner to be fully described hereinafter.

The mechanism 17 is supported by hinge members 21 (only one being shown) one end of which is secured in an elongated slot 22 provided in a frame member 23, made from any suitable electrically nonconducting material, for example, plastic. The frame member 23 is attached by a pin member 24 to a stanchion 26 carried by the motor 18. A second frame member, not shown, cooperates with the frame member 23 to support the mechanism 17 through the hinges 21.

Figure 4:
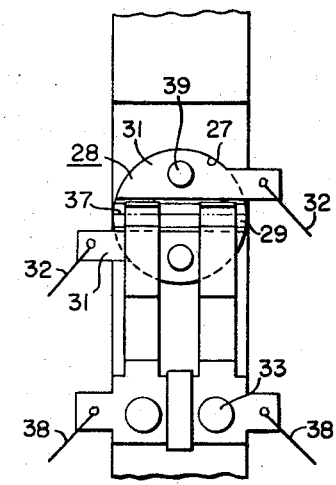
FIG. 4 is a bottom plan view of a switch forming part of the invention.

The frame member 23 is provided with a recess 27 for receiving a switch sub-assembly 28. The sub-assembly 28 comprises a generally circular electrically nonconducting member 29 (see FIG. 4) on which are mounted spaced apart conductors 31 which are connected to the poles of the motor 18 by suitable electrical leads 32.

Each of a pair of finger-like conductors 33 is attached to one end thereof to the frame member 23 by rivets 34 while the other end is provided with a detent 36 which in the inoperative position of the switch comprising the sub-assembly 28 and the conductors 33 rest in a notch 37 in the nonconductor 29 intermediate the spaced apart conductors 31. The finger-like conductors are made from resilient material and exert sufficient force against the sub-assembly 28 to captivate it in the recess 37. The conductors 33 are connected to the battery 19 by suitable leads 38. It should now be apparent that by rotating the sub-assembly 28 in a clockwise direction (as viewed in FIG. 4) the detents 36 of the conductors 33 will engage different ones of the conductors 31 to establish a first polarity through the motor 18 while rotation in the opposite direction will serve to reverse the polarity of the motor. Rotation in either direction is limited by the rivets or pins 39 which mount the conductors 31 to the nonconducting member 29.

Figure 2:
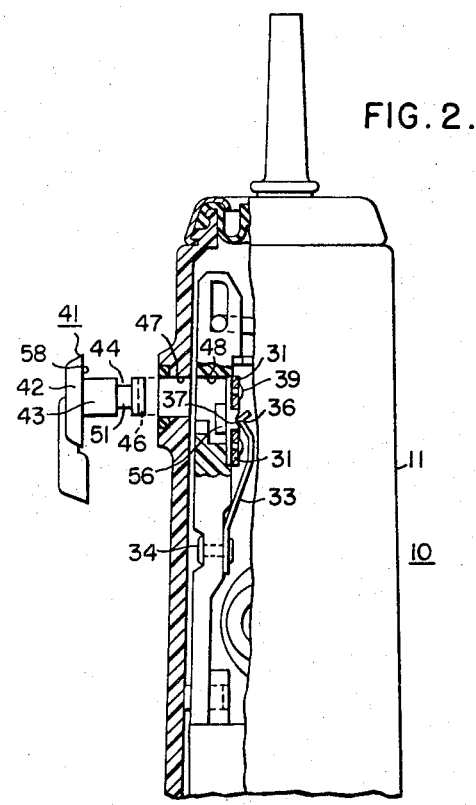
FIG. 2 is a fragmentary view, partly broken away of the device illustrated in FIG. 1, but in a partially assembled condition.
Figure 3:
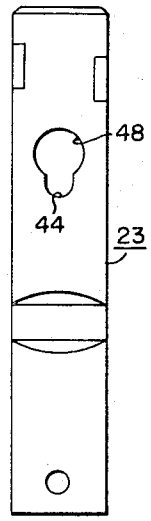
FIG. 3 is a frame member forming a part of the device shown in FIGS. 1 and 2.

To effect engagement and disengagement of the conductors 31 and 33 a switch actuator 41 is provided. The actuator, as best shown in FIG. 2, comprises a base portion 42 and a shank portion 43 having an annular recess or slot 44 and a grove 46 in the end thereof. The shank portion 43 is insertable through an aperture 47 in the casing 11 and into the larger area of substantially key-shaped aperture 48 in the frame member 23, the former and the latter being temporarily aligned during assembly of the unit 10. After insertion of the shank portion has been completed the frame 23 is pushed as are the motor 18, battery 19 and the mechanism 27 until they are fully inserted and until the necked down portion 51 of the shank is received in the smaller area of the key-shaped aperture 48 whereat a shoulder 52 partially defining the recess 44 cooperates with a lip 54 of the frame 23 to retain the actuator 41 in the plane.

A tongue 56 carried by the nonconducting member 29 is received in the groove 46 and cooperates with the walls delineating the groove to positively link the actuator to the switch comprising the sub-assembly 28 and the finger like conductors 33. To prevent water leakage through the aperture 47 an O-ring sealing gasket 57 is provided which is compressed between the underside 58 of the base 42 and the shank 43, see FIGURE 1.

Since numerous changes may be made in the above-described device and different embodiments of the invention may be made without departing from the spirit thereof, it is intended that all matter contained in the foregoing descripion or shown in the accompanying drawings, shall be interpreted as illustrtaive and not in a limiting sense.

I claim:
1. Switch assembly means for use with domestic appliances having a hollow casing with motion generating mechanism including a motor and source of power therefor disposed in the casing, said switch assembly means comprising: contact structure and support means therefor, means for actuating said contact structure, said contact actuating means having a shank portion inserted through an aperture in said casing and means in said support member for captivating said portion for maintaining said contact actuating means in said aperture, said support means comprising a frame member and said captivating means comprising a lip delineating the smaller portion of a substantially key-shaped aperture in said frame member, and said shank portion has shoulder means cooperating with said lip.
2. Structure as specified in claim 1, wherein said shank portion is provided with groove means for receiving said lip, said groove means being defined by said shoulder means which engage said lip when the latter is received in said groove means, and the larger portion of said substantially key-shaped aperture is slightly larger than the cross-section of said shank portion for permitting insertion of said shank portion to a point where said lip can be moved into said groove means.
3. Structure as specified in claim 2, wherein said contact support means further comprises a rotatable member carrying at least one electrical conductor element disposed in a recess in said support member and is retained therein by at least one resilient contact arm mounted to said frame member.
4. Structure as specified in claim 3, including means for positively coupling said actuating means and said rotatable contact support member.
5. Structure as specified in claim 4, wherein said positive coupling means comprises a tongue and groove arrangement.
6. Structure as specified in claim 2, wherein said contact support means further comprises an electrically nonconducting rotatable member carrying spaced apart electrical conductors adapted to be operably connected to said motor, and a pair of contact arms carried by said frame and adapted to be connected to said source of power, said contact arms cooperating with said spaced apart conductors for selectively establishing first and second polarities through said motor.
7. Structure as specified in claim 6, wherein said rotatable member is disposed in a recess in said frame member and said contact arms are made of resilent material and engage said rotatable member for retention thereof in said recess.

References Cited
UNITED STATES PATENTS 2,836,686   5/1958   Barden et al. _____ 200—172 XR
2,644,062   6/1953   Williams _____ 200—172 X ROBERT K. SCHAEFER, *Primary Examiner.*

H. BURKS, *Assistant Examiner.*

U.S. Cl. X.R.
200—172